Figure 1:
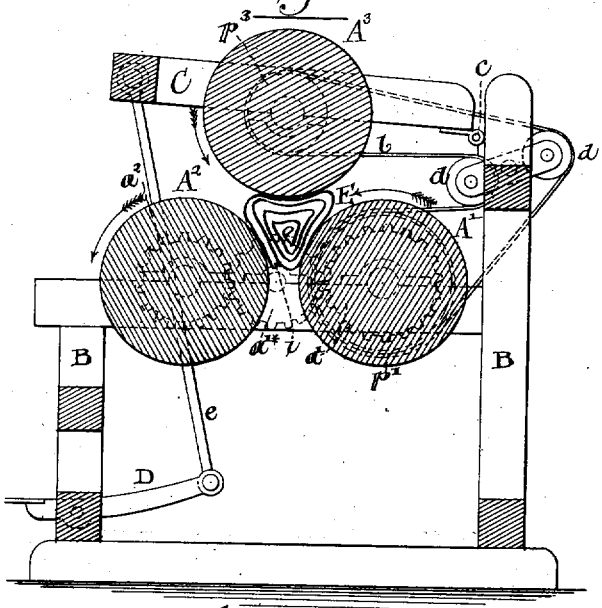

J. T. WARING.

Felting Hat Bodies, &c.

No. 9,683. Reissued April 26, 1881.

Witnesses:-

Fred. Haynes

Ed Glatzmayer

Inventor:-

John T. Waring by his Attorneys

Brown & Brown

N. PETERS, PHOTO-LITHOGRAPHER, WASHINGTON, D. C.

UNITED STATES PATENT OFFICE.

JOHN T. WARING, OF NEW YORK, N. Y.

FELTING HAT-BODIES, &c.

SPECIFICATION forming part of Reissued Letters Patent No. 9,683, dated April 26, 1881.

Original No. 228,704, dated June 8, 1880. Application for reissue filed March 31, 1881.

*To all whom it may concern:*

Be it known that I, JOHN T. WARING, late of the city of Boston, in the county of Suffolk and State of Massachusetts, but now of the city, county, and State of New York, have invented certain new and useful Improvements in Machinery for Felting Hat-Bodies and other Articles, of which the following is a specification, reference being had to the accompanying drawings.

This invention relates, in part, to that description of machines for sizing or felting hat-bodies and other articles, the principal elements of which are a series of rollers having parallel axes, and between and lengthwise of which a roll of hat-bodies or other articles in a sizing-cloth is placed and subjected to a rolling and pressing operation. Such machines are commonly provided with either three or four rollers, but might have a greater number.

In such machines as heretofore constructed all the rollers rotate with uniform surface velocity; but one feature of this invention consists in so constructing, gearing, and driving the said rollers that they rotate at different surface velocities, and thereby have a tendency to repeatedly loosen and tighten the sizing-cloth and the roll contained therein, instead of gradually rolling them up tighter and tighter, as is done when the rollers have a uniform surface velocity. The effect of this alternate loosening and tightening of the cloth and the roll is to keep the roll soft, and so produce a better working of the felt than is possible when it is gradually rolled up tighter and tighter, and so compacted into a hard dead mass, in which condition the working and felting ceases.

The different surface velocities of the several rollers may be obtained, when the rollers are all of uniform diameter, by so driving them that some make a greater number of revolutions than others. The several rollers may, however, be so driven that all make the same number of revolutions, and may have the different surface velocities produced by making them of different diameters. The rollers may be smooth cylinders, or may have their surfaces ribbed, lagged, or corrugated, or otherwise provided with projections or protuberances, and the difference of surface velocity may be obtained by making the bodies of the several rollers of uniform size, but making the ribs, lags, or protuberances more prominent on some than on others.

A second feature of the invention consists in the construction of the working-surfaces of felting-machines, or portions of said surfaces, with their profiles, taken in a direction transverse to the direction of their working movement, of such concave, curved, or taper form, and in so arranging the so constructed working-surfaces that there is formed between the said surfaces, for the reception of the roll of hat-bodies or other articles, a cavity or pocket, which is larger at the middle of the length of such profile and tapers toward the ends thereof, by which means I prevent the extension in a longitudinal direction of the roll of hat-bodies or other articles placed between the said surfaces, and thereby obtain a more rapid shrinking or sizing. The so constructed and arranged working-surfaces may be ribbed, lagged, or bossed, and when ribbed or lagged may have the concave, curved, or taper profile in the direction transverse to the direction of their working movement produced by giving to the faces of the ribs or lags the requisite concave, curved, or taper form; and my invention further consists in such ribbed or lagged construction of such surfaces.

Figure 2:
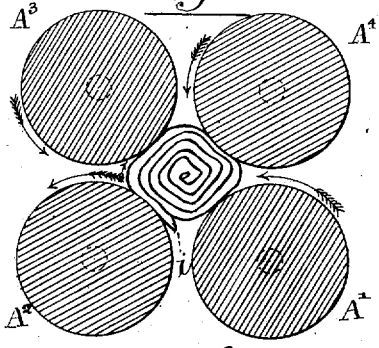
Figure 3:
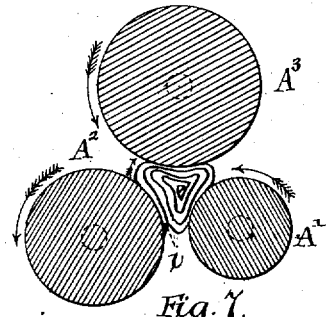
Figure 4:
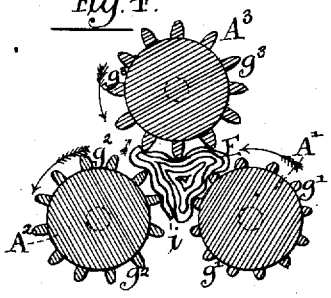
Figure 5:
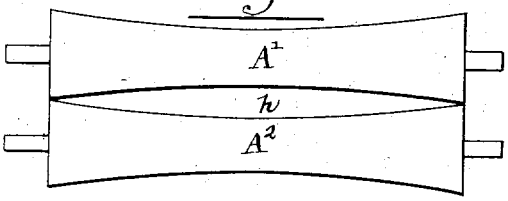
Figure 6:
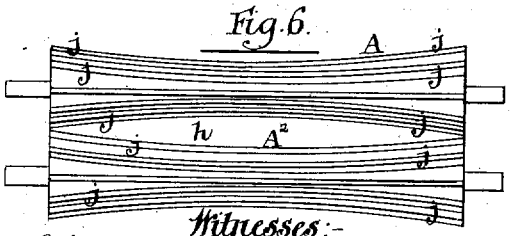
Figure 7:
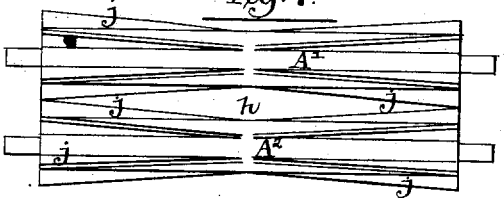
Figure 8:
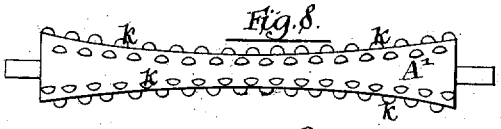
Figure 9:
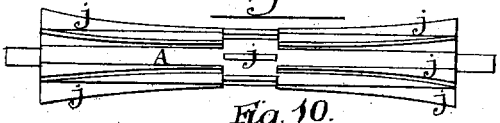
Figure 10:
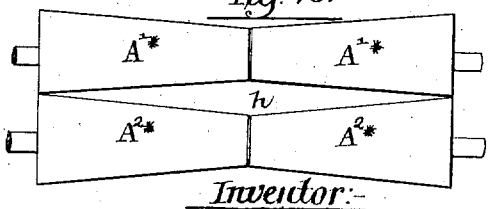

Figure 1 is a transverse section of a sizing-machine, illustrating the first-mentioned part of my invention. Figs. 2, 3, and 4 are transverse sections of different sets of rollers adapted to such a machine, illustrating modifications of my invention. Fig. 5 is a horizontal view of two rollers adapted to such a machine, and illustrating the second feature of my invention. Fig. 6 is a similar view of two rollers, exhibiting a modification of this part of the invention. Fig. 7 is a similar view, exhibiting another modification of the same. Figs. 8 and 9 are longitudinal views of other rollers, exhibiting further modifications of the same. Fig. 10 represents four rollers, illustrating a still further modification.

B, Fig. 1, is the fixed main framing of the machine, having fixed bearings for the journals of the two rollers $A'$ and $A^2$, which are so geared together by gears $a'$ $a^2$ and an intermediate gear, $a^*$, that the said rollers rotate in the same direction.

C is a frame hinged at $c$ to the main frame B, and having upon it bearings for a third roller, $A^3$, which is so driven by a belt, $b$, run from a pulley, $p'$, on the shaft of the roller A, and over guide-pulleys $d$ $d$, to a pulley, $p^3$, on its own shaft, that it rotates in the same direction as $A'$ and $A^2$. The frame C is so connected by a rod, $e$, with a treadle, D, that the said frame and its roller may be raised by the pressure of the foot of the attendant upon the treadle for the purpose of placing a roll, E, of hat-bodies or other articles between the rollers $A'$ $A^2$ $A^3$ and removing it therefrom. The said frame may be weighted or loaded in any suitable manner to produce a necessary pressure on the roller $A^3$ and upon the roll E.

This machine has all its rollers cylindrical and of equal diameter, and only differs from sizing-machines heretofore in use and well known in that its several rollers, instead of being geared together by gears or pulleys of uniform size, and thereby being made to rotate with uniform surface velocities, are geared together by gears or pulleys of unequal size, and thereby caused to make unequal numbers of revolutions, and so to have unequal surface velocities, the gear $a'$ being represented as so much larger than $a^2$ and the pulley $p'$ so much larger than the pulley $p^3$ that the surface velocity of $A^2$ is greater than that of $A'$ and that of $A^3$ is greater than that of $A^2$. These rollers, instead of having smooth peripheries, may have their peripheries furnished or constructed with lags or other projections or protuberances.

The set of rollers shown in Fig. 2 are also all of uniform size, as in other known machines provided with four rollers, the two lower ones being mounted in a fixed frame and the upper ones in a frame which is capable of an upward and downward motion. These rollers are intended to be geared together by gears or pulleys of such different sizes that they rotate with unequal surface velocities. They may be so geared that $A'$ and $A^3$ rotate at uniform velocities, and that $A^2$ and $A^4$ rotate at uniform velocities, but at greater velocities than $A'$ and $A^3$; or their relative difference of velocity may be otherwise varied by suitable gearing.

The set of three rollers $A'$, $A^2$, and $A^3$, which may be mounted in frames B and C, like those shown in Fig. 1, and similarly lettered, are intended to be so geared that all make the same number of revolutions, and their unequal surface velocities are produced by making the rollers themselves of different diameters, $A^2$ being shown larger than $A'$, and $A^3$ larger than $A^2$.

The set of three rollers $A'$, $A^2$, and $A^3$ (shown in Fig. 4) are also intended to be mounted in frames B and C, in the same manner as those shown in Fig. 1, and similarly lettered, and are intended all to make the same number of revolutions. They are constructed with ribs, lags, or protuberances, which may be of any desired form. Their bodies are all shown of the same size, but an unequal surface velocity is produced by making the ribs, lags, or protuberances of different size, projection, or prominence, those, $g^2$, on $A^2$ being represented as larger or more prominent than $g'$ on $A'$, and those, $g^3$, on $A^3$ being larger or more prominent than $g^2$.

The hat-bodies or other articles to be treated between the rollers with unequal velocities may be rolled up into a roll, E, in the usual way in a sizing-cloth and placed between the rollers, as shown in Figs. 1, 2, 3, 4, the direction of the roll of the cloth being such, relatively to the direction of revolution of the rollers, that in the rotary motion given to the roll E by the rotation of the rollers the outer edge of the lap of the cloth will be presented in a backward direction relatively to the rotation of the roll E, which will be understood by reference to the several figures of the drawings, and the arrows shown thereon to indicate the directions of rotation. The effect of this will be that in passing from a slower to a faster roller there will be a tendency to loosen the cloth, and in passing from a faster to a slower roller a tendency to tighten it. This alternate tightening and loosening is found in practice to keep the roll E from compacting so much or so rapidly as is the case when the rollers all have uniform surface velocities, and the result is a much better working of the felt and a more rapid felting action.

The rollers $A'$ $A^2$ (shown in Fig. 5 to illustrate the second feature of my invention) are arranged with their axes parallel. They have smooth peripherical working-surfaces, and have a longitudinal profile of a regular concave form. The cavity or pocket $h$, (produced between two or more of these rollers) for the reception of the roll E of hat-bodies or other articles to be felted, is shown to be largest at the middle of the length of the concave longitudinal profile of the rollers and to taper toward its ends. These rollers may be modified by making their profiles with a straight taper from the ends toward the middle of their length, or with a portion of the length, at and near the middle, cylindrical, and increasing in size toward the ends.

The rollers $A'$ $A^2$ shown in Fig. 6 are like those in Fig. 5, except that their peripherical working-surfaces are made uneven or irregular by being constructed or provided with longitudinal ribs or lags $j$ $j$ of a profile form corresponding, or nearly so, with that of the bodies of the rollers themselves.

In the modification shown in Fig. 8, instead of longitudinal ribs on the rollers, uneven working-surfaces are obtained by a series of studs or bosses, $k$ $k$, which may be produced by driving pegs into holes provided for them in the bodies of the rollers, which may be of wood or other suitable material.

In the modification shown in Fig. 7 the bodies of the rollers are cylindrical, and there are provided thereon lags or ribs $j$ $j$, the outer edges or profiles of which are wedge-shaped or of a straight taper form.

In both of the examples illustrated by Figs. 6 and 7, the ribs or lags *j j* constitute the principal portions of the working-surfaces of the felting-machine, and in both cases the ribs present, as do the peripheries of the rollers shown in Fig. 5, working-surfaces having concave profiles in a direction transverse to the direction of the working movement—viz., to the direction of the rotation of the rollers—such surfaces producing between them a cavity or pocket, *h*, of a longitudinal sectional form, substantially like that described with reference to Fig. 5.

In Fig. 9 the ribs or lags *j j* are shown as in sections of a length less than the whole length of the roller, and set with middle sections opposite the spaces between the end sections, but in such way that the general longitudinal profile of the roller is concave, as in the other figures.

In Fig. 10 two taper rollers are shown in place of each single roller, with concave profile, the two, $A'$ or $A^2$, being arranged on one shaft or otherwise with a corresponding axis, the smaller ends of each two of the said rollers being arranged together, so as to produce between them, as in the other examples, a cavity, *h*, which is largest at the middle of its length and tapers toward its ends. In this modification of my invention I should prefer to use eight rollers, placed two on each of four shafts arranged like the shafts of the four rollers shown in Fig. 2.

The tendency of the above-described concavity of profile of the working-surfaces and the consequent form of the cavity *h* between them, (larger at the middle and taper toward the ends,) is to gather in the roll E lengthwise or prevent its longitudinal extension, and thereby to obtain a more effective and rapid shrinking or sizing.

Both features of my invention admit of the use of an ordinary sizing-cloth with smooth surface, or of the sizing-cloth with an irregular surface, which is the subject-matter of a United States Patent, No. 227,331, granted to me, and dated May 4, 1880.

What I claim as my invention, and desire to secure by Letters Patent, is—

1. In a machine for felting hat-bodies and other articles, rollers having their axes parallel, or nearly parallel, with each other, and adapted to receive lengthwise between them a roll of hat-bodies or other articles, and having different surface velocities, substantially as herein described, for the purpose set forth.

2. A felting-machine in which the whole or a portion of the working-surfaces have, in a direction transverse to the working movement, a profile of concave, curved, or taper form, and in which the so formed working-surfaces are so arranged that there is formed between the said surfaces a pocket or cavity which is larger at the middle of the length of such profile and tapers toward the ends thereof, substantially as herein described.

3. A felting-machine having its working-surfaces of ribbed or lagged construction, and having the faces of its ribs or lags of concave, curved, or taper form, and arranged to form between the said surfaces a pocket or cavity which is largest at the middle of its length and smaller toward its ends, substantially as herein described.

4. In a machine for felting hat-bodies and other articles, rollers having their axes parallel, or nearly so, with each other, and having concave or taper longitudinal profiles, whereby there is formed between the said rollers, for the reception of a roll of hat-bodies or other articles arranged lengthwise of the said rollers, a cavity which is larger at the middle of its length and smaller at the ends, substantially as and for the purpose herein described.

5. In a machine for felting hat-bodies and other articles, rollers having concave or taper longitudinal profiles, and having irregular or uneven operating-surfaces, substantially as herein described.

JOHN T. WARING.

Witnesses:

FREDK. HAYNES,

ED. GLATZMAYER.